United States Patent [19]

de la Burde et al.

[11] 4,340,142
[45] Jul. 20, 1982

[54] TOBACCO RECOVERY FROM STEMMERY DISCARDS

[75] Inventors: Roger Z. de la Burde, Powhatan; Russell B. Mait, Richmond; Francis V. Utsch, Midlothian, all of Va.

[73] Assignee: Philip Morris Incorporated, New York, N.Y.

[21] Appl. No.: 176,228

[22] Filed: Aug. 7, 1980

[51] Int. Cl.³ ............................................... B03B 1/02
[52] U.S. Cl. .................................... 209/11; 209/127 R
[58] Field of Search ................. 209/11, 127 R, 127 A, 209/127 B, 127 C, 128-131, 3

[56] References Cited

U.S. PATENT DOCUMENTS

| | | | |
|---|---|---|---|
| 1,355,477 | 10/1920 | Howell | 209/127 C |
| 1,872,591 | 8/1932 | Homan | 209/127 A |
| 1,968,860 | 8/1934 | Strang | 209/127 C |
| 2,559,076 | 7/1951 | Johnson | 209/127 A |
| 2,805,708 | 9/1957 | Lawver | 209/11 |
| 2,839,189 | 6/1958 | Johnson | 209/127 R |
| 2,848,108 | 12/1958 | Brastad | 209/127 |
| 2,881,916 | 4/1959 | Cook | 209/11 X |
| 3,143,492 | 8/1964 | Bullock | 209/127 R |
| 3,402,814 | 9/1968 | Morel | 209/127 R |
| 3,837,481 | 7/1971 | Stungis | 209/4 |
| 3,941,684 | 3/1976 | Bradbury | 209/127 R |
| 4,116,822 | 9/1978 | Webb | 209/11 |
| 4,226,703 | 10/1980 | Stout | 209/127 B |

FOREIGN PATENT DOCUMENTS

| | | | |
|---|---|---|---|
| 54-10274 | 1/1979 | Japan | 209/11 |
| 1374308 | 11/1974 | United Kingdom | 209/127 R |
| 2029731 | 7/1979 | United Kingdom | |
| 380354 | 8/1973 | U.S.S.R. | 209/127 R |

OTHER PUBLICATIONS

American Miller and Processor, 4,1952, pp. 26–30.

Primary Examiner—Robert Halper
Attorney, Agent, or Firm—Arthur I. Palmer; Nelson A. Blish

[57] ABSTRACT

A method for separating tobacco and sand in stemmery discards is disclosed. The sand tobacco mixture is passed through dryer (14), to reduce the moisture content, agitated by conveyor (16), passed through sieve (18), to obtain the correct particle size and to mechanically agitate the mixture, and is then passed through electrostatic separators (24) and (25) to separate the sand from the tobacco. Portions of the electrostatically separated sand tobacco mixture may be passed through another electrostatic separator (26) to achieve a further separation of sand and tobacco.

2 Claims, 2 Drawing Figures

TOBACCO RECOVERY FROM STEMMERY DISCARDS

BACKGROUND OF THE INVENTION

This invention relates to the separation of organic from inorganic matter, and more particularly to the separation of tobacco from sand.

DESCRIPTION OF THE PRIOR ART

During the growth of tobacco plants, sand is often trapped on the tobacco leaves and stems. During threshing operations in the tobacco factory, small particles containing both sand and tobacco are produced. These small particles of sand and tobacco are currently unusable because of the high sand content. In order to be utilized in tobacco production, it is desirable that the sand content be less than 10 percent. The tobacco in this sand/tobacco mixture, which amounts to millions of pounds annually, is quite valuable. However, with current methods, the sand and tobacco cannot be separated and so the entire mixture must be discarded.

Various attempts have been made by tobacco companies to recover the small particles of tobacco from the sand. One such method was air table separation. Although some recovery was achieved, the method was only marginally effective. Flotation techniques were also tried, but the results were again marginal. Neither technique worked when the particles were smaller than 60 mesh size. (Mesh size is the number of openings per linear inch. Particles smaller than 60 mesh size are those which would pass through a 60 mesh screen.).

Electrostatic separators have been used in the past for a variety of materials. For example, Carpenter, U.S. Pat. No. 3,256,985, used an electrostatic separator to separate particles according to the shape of the particles. Bartlett, U.S. Pat. No. 2,174,681, disclosed an apparatus for separating solid materials having different electrical properties. A device for electrostatic separation of plastic film from shredded waste, is disclosed by McKinzie et al, U.S. Pat. No. 4,092,241. These and other patents dealing with electrostatic separation deal primarily with discrete particles or discrete mixtures. None of the prior art discloses electrostatic separation of mixtures which are bonded together, such as sand and tobacco in stemmery discards.

It is therefore, an object of the present invention to provide a method for separating organic from inorganic matter where there is some degree of adhesion or bonding between the organic and inorganic material.

It is also an object of the present invention to provide a method for separating organic from inorganic matter that is effective when the organic and inorganic matter is of small particle size.

SUMMARY OF THE INVENTION

According to the present invention, the foregoing and other objects are obtained by passing the sand/tobacco mixture through a dryer to reduce the moisture content, mechanically agitating the sand/tobacco mixture to break mechanical adhesion forces, passing the sand/tobacco through a sieve to size the particles and to facilitate electrostatic separation, and passing the sand/tobacco mixture through electrostatic separators to separate the sand/tobacco mixture. The mixture may be passed through electrostatic separators more than once depending on the reduction in the sand content desired.

BRIEF DESCRIPTION OF THE DRAWINGS

A more complete appreciation of the invention and many of the attendent advantages thereof, will be readily apparent by reference to the following detailed description when considered in connection with the accompanying drawings wherein.

DESCRIPTION OF THE PREFERRED EMBODIMENT

Figure 1:
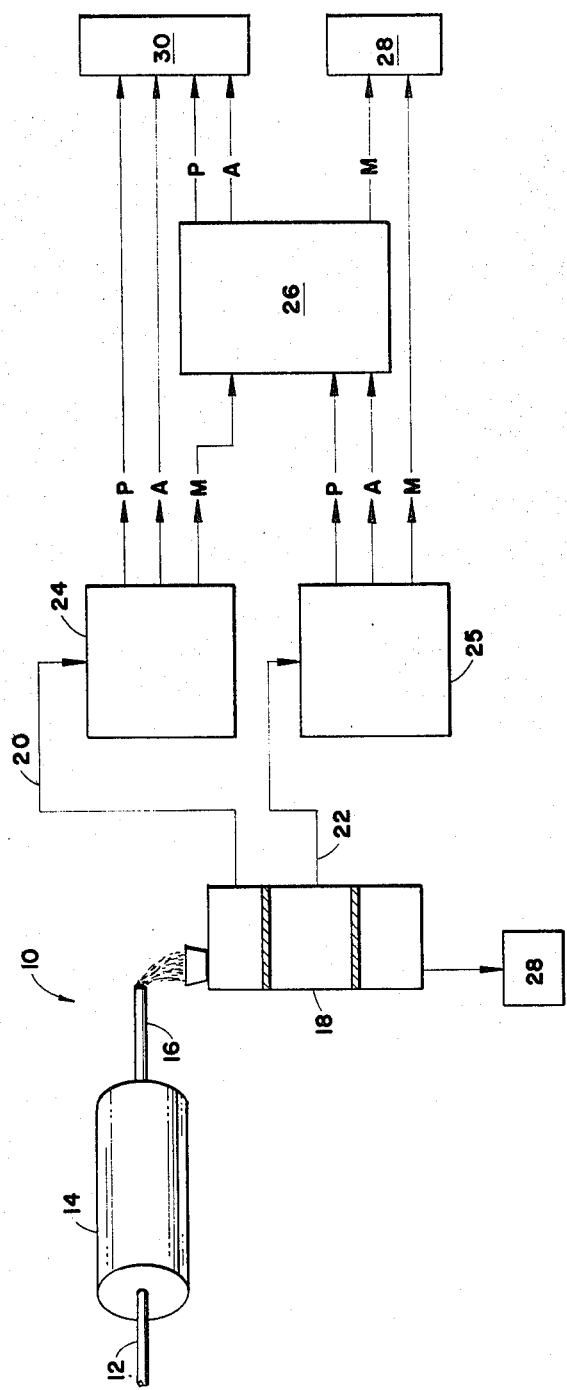
FIG. 1 is a schematic of a sand/tobacco separator according to the present invention.

Referring now more particularly to the drawings and specifically to FIG. 1, there is illustrated a preferred embodiment of the invention as it would be used to separate organic and inorganic matter, in this case sand and tobacco in stemmery discards, and designated generally by reference numeral 10. Tobacco recovery apparatus 10 has four major components; dryer 14, conveyor agitating means 16, sieve 18, and electrostatic separators 24, 25, and 26.

The sand tobacco mixture is conveyed to dryer 14 by conventional means such as conveyor 12. The sand tobacco mixture reaching dryer 14 will typically be smaller than 60 mesh particle size and have a moisture content of approximately 12 percent. Dryer 14 reduces the moisture content of the sand tobacco mixture to approximately 1 to 5 percent moisture. The drying reduces the adhesive forces between the sand and tobacco.

After passing through dryer 14, the sand/tobacco mixture is carried to sieve 18 on a vibrating conveyor 16. Vibrating conveyor 16 provides mechanical agitation necessary to disrupt mechanical bonds between the sand and tobacco particles.

In the preferred embodiment, the sand/tobacco mixture is next passed through sieve 18. Sieve 18 provides further mechanical agitation and divides the sand tobacco mixture into particle sizes −60 to +100 mesh, and particle sizes −100 to +170 mesh. Those particles smaller than 170 mesh are discarded 28. The sand/tobacco mixture is passed through sieve 18 in the preferred embodiment to further enhance the effectiveness of electrostatic separators 24, 25, and 26. Sieve means 18 are well known in the art. However, in the preferred embodiment, a Sweco Separator was used.

Conveyor 20 transports tobacco/sand particles in the −60 to +100 mesh size to electrostatic separator 24. Sand/tobacco particles in the −100 to +170 mesh size are transported by conveyor 22 to electrostatic separator 25. Portions of the separated sand/tobacco mixture from electrostatic separators 24 and 25 are passed to electrostatic separator 26 for further separation.

Figure 2:
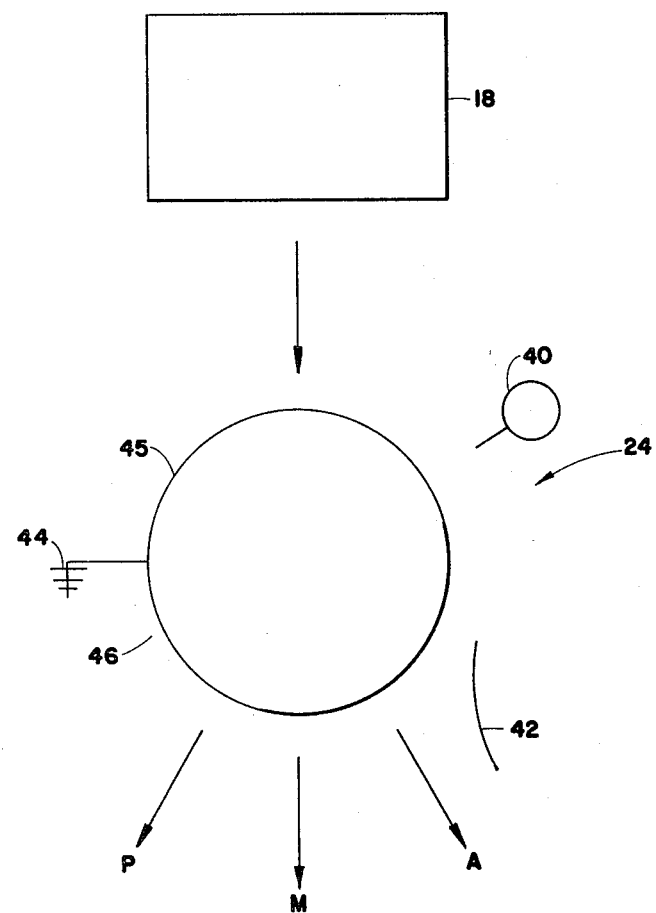
FIG. 2 is a schematic of an electrostatic separator as used in the present invention.

An electrostatic separator 24 is shown in FIG. 2 (Electrostatic separators 25 and 26 are similar). Electrostatic separators are well known in the art and are available commercially. In the preferred embodiment, the electrostatic separator used was Carpco, Inc., model HTE(36)111-46RSE Electrostatic High Tension Separator. The tobacco sand mixture enters electrostatic separator 24 from conveyor 20 and falls on rotating drum 45. Rotating drum 45 is grounded at ground 44 and rotates in a clockwise direction. Discharge electrode 40 inparts a charge to the sand/tobacco mixture falling between discharge electrode 40 and rotating drum 45. Electrode 42 which is positively charged attracts those particles which are negatively charged. Those particles which are positively charged adhere to rotating drum 45 which is grounded. Experimental results indicate that separation occures only over a narrow range of electrode voltages. In the preferred embodiment separation was most effective when electrode 42 voltage potential was between 9 and 15 kilovolts.

The attracted or deflected particles, designated by letter A, are those which are attracted from deflected from the rotating drum. The middling particles, designated by letter M, are those which remain on the drum until pulled off by gravitational forces. The pinned particles, designated by letter P, are those which adhere to the drum and must be removed by brush 46.

Referring again to FIG. 1, the pinned P and attracted or deflected A particles from electrostatic separator 24 are recovered at 30. The middling M particles from electrostatic separator 24 are passed through an additional electrostatic separation step 26 to further reduce the sand content. The pinned P and the attracted A particles from electrostatic separator 25 are also passed through an additional electrostatic separator 26 to further reduce the sand content. The middling M particles from electrostatic separator 25 are discarded at 28. Middling M particles from electrostatic separator 26 are also discarded. Pinned P and attracted or deflected A particles from electrostatic separator 26 are recovered at 30.

Experimental results indicate that sand/tobacco mixtures with an initial sand content of approximately 30 percent can be separated according to the present invention with one-third of the material suitable for use, that is having a sand content of approximately 10 percent or less.

It is thus seen that a method and apparatus according to the present invention may be used to separate out tobacco with a sand content of 10 percent or less from a sand tobacco mixture comprised of sand and tobacco particles with some amount of bonding or adhesion. It is also seen that this method works for relatively small particles, such as those in the 60 to 170 mesh range.

It will be understood that the foregoing description is of the preferred embodiment of the invention and is, therefore, merely representative. Obviously there are many variations and modifications of the present invention in the light of the above teachings that will be readily apparent to those skilled in the art. For example, the organic and inorganic material may be other than tobacco and sand. It is, therefore, understood that within the scope of the appended claims the invention may be practiced otherwise than as specifically described.

We claim:

1. A method of separating a tobacco and sand mixture having a high sand content comprising:
   a. Drying said tobacco and sand to 1 to 5 percent moisture to reduce the adhesive forces between said tobacco and sand;
   b. Mechanically agitating said dried tobacco and sand to disrupt mechanical bonds between said tobacco and sand;
   c. Passing said dried and agitated tobacco and sand through an electrostatic separator wherein said electrostatic separator operates at a voltage range of approximately 9 to 15 kilovolts and separates said tobacco and sand into three fractions, a fraction that is pinned to a rotating drum in said separator, a middling fraction, and a fraction that is deflected away from the drum; and
   d. Discarding said middling group and collecting said pinned and deflected groups.

2. A method as in claim 1 wherein a sieve separates out all of said tobacco and sand except particles in the size range of $-60$ to $+170$ mesh after said tobacco and sand has been agitated and prior to passing through said electrostatic separator.

* * * * *